US010110556B2

(12) United States Patent
Nistor

(10) Patent No.: US 10,110,556 B2
(45) Date of Patent: Oct. 23, 2018

(54) METHODS, SYSTEMS, AND COMPUTER READABLE MEDIA FOR INITIATING AND EXECUTING PERFORMANCE TESTS OF A PRIVATE NETWORK AND/OR COMPONENTS THEREOF

(71) Applicant: Ixia, Calabasas, CA (US)

(72) Inventor: Marius Pavel Nistor, Bucharest (RO)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 190 days.

(21) Appl. No.: 14/574,359

(22) Filed: Dec. 17, 2014

(65) Prior Publication Data
US 2016/0173444 A1 Jun. 16, 2016

(30) Foreign Application Priority Data
Dec. 16, 2014 (RO) .............................. A/00994/2014

(51) Int. Cl.
 *H04L 29/12* (2006.01)
 *H04L 12/26* (2006.01)
 (Continued)

(52) U.S. Cl.
 CPC ........ *H04L 61/256* (2013.01); *H04L 41/0806* (2013.01); *H04L 43/50* (2013.01);
 (Continued)

(58) Field of Classification Search
 CPC ... H04L 61/256; H04L 43/50; H04L 61/2007; H04L 61/2578; H04L 69/16; H04L 69/30; H04L 61/2514; H04W 84/105
 See application file for complete search history.

(56) References Cited

U.S. PATENT DOCUMENTS 6,381,218 B1 4/2002 McIntyre et al.
8,065,418 B1 11/2011 Abuan et al.
(Continued)

FOREIGN PATENT DOCUMENTS

WO WO 03/069493 A1 8/2003
WO WO 2016/130280 A1 8/2016

OTHER PUBLICATIONS

Notification of Transmittal of the International Search Report and the Written Opinion of the International Searching Authority, or the Declaration for International Application No. PCT/US2016/013827 (dated May 2, 2016).
(Continued)

*Primary Examiner* — Shean Tokuta
*Assistant Examiner* — Juan C Turriate Gastulo

(57) ABSTRACT

Methods, systems, and computer readable media for initiating and executing a performance test of a private network and/or components thereof are disclosed. Methods and systems include a receiver endpoint in a private network, and a sender endpoint in a public network. The receiver endpoint initiates a transport layer connection with the sender endpoint. The sender endpoint allocates a port, binds to the port, and sends an Internet Protocol (IP) address and a port number over the transport layer connection. The receiver endpoint then sends a hole punch datagram from the private network to the public network to create a hole in a firewall that is separating the public and private networks. The sender endpoint receives the hole punch datagram and uses IP address and port information in the hole punch datagram to send test traffic through the hole in the firewall.

17 Claims, 6 Drawing Sheets

(51) Int. Cl.
*H04L 29/06* (2006.01)
*H04L 29/08* (2006.01)
*H04L 12/24* (2006.01)
*H04W 84/10* (2009.01)

(52) U.S. Cl.
CPC .......... *H04L 61/2578* (2013.01); *H04L 69/16* (2013.01); *H04L 69/30* (2013.01); *H04L 61/2514* (2013.01); *H04W 84/105* (2013.01)

(56) References Cited

U.S. PATENT DOCUMENTS

| | | | |
|---|---|---|---|
| 9,052,941 B1 | 6/2015 | Bone | |
| 9,608,906 B2 | 3/2017 | Constantinescu et al. | |
| 9,680,877 B2 | 6/2017 | Duffield et al. | |
| 9,769,291 B2 | 9/2017 | Nistor et al. | |
| 9,814,008 B2 | 11/2017 | Nistor | |
| 2002/0124189 A1* | 9/2002 | Bakke | H04L 63/029 726/11 |
| 2004/0240468 A1 | 12/2004 | Chin et al. | |
| 2005/0076235 A1* | 4/2005 | Ormazabal | H04L 63/02 726/4 |
| 2005/0226194 A1 | 10/2005 | Fan et al. | |
| 2006/0062203 A1* | 3/2006 | Satapati | H04L 29/06 370/352 |
| 2007/0083788 A1 | 4/2007 | Johnson et al. | |
| 2007/0213966 A1* | 9/2007 | Noble | H04L 41/145 703/13 |
| 2007/0283002 A1 | 12/2007 | Bornhoevd et al. | |
| 2008/0072312 A1 | 3/2008 | Takeyoshi et al. | |
| 2008/0317020 A1* | 12/2008 | Horne | H04L 29/12509 370/389 |
| 2009/0040942 A1* | 2/2009 | Yang | H04L 12/2602 370/253 |
| 2009/0077245 A1 | 3/2009 | Smelyansky et al. | |
| 2009/0154363 A1 | 6/2009 | Stephens | |
| 2010/0183151 A1 | 7/2010 | Wing et al. | |
| 2011/0010413 A1 | 1/2011 | Christenson et al. | |
| 2011/0187864 A1 | 8/2011 | Snider | |
| 2011/0289440 A1 | 11/2011 | Carter et al. | |
| 2012/0054491 A1 | 3/2012 | Tippett | |
| 2012/0075439 A1 | 3/2012 | Gong et al. | |
| 2012/0078547 A1 | 3/2012 | Murdoch | |
| 2013/0173962 A1 | 7/2013 | Li et al. | |
| 2013/0272322 A1 | 10/2013 | Sagarwala et al. | |
| 2014/0119203 A1 | 5/2014 | Sundaram et al. | |
| 2014/0280901 A1 | 9/2014 | Blachandran et al. | |
| 2014/0310397 A1* | 10/2014 | Tseng | H04L 61/2507 709/224 |
| 2015/0242294 A1 | 8/2015 | Lapierre et al. | |
| 2016/0014011 A1 | 1/2016 | Liu et al. | |
| 2016/0156541 A1 | 6/2016 | Nistor et al. | |
| 2016/0174178 A1 | 6/2016 | Nistor | |
| 2016/0234113 A1 | 8/2016 | Constantinescu et al. | |
| 2016/0234163 A1 | 8/2016 | Nistor et al. | |
| 2016/0248795 A1 | 8/2016 | Chien | |

OTHER PUBLICATIONS

Non-Final Office Action for U.S. Appl. No. 14/572,746 (dated Aug. 24, 2016).
Non-Final Office Action for U.S. Appl. No. 14/619,039 (dated Jul. 13, 2016).
Commonly-assigned, co-pending U.S. Appl. No. 14/572,746 for "Methods, Systems, and Computer Readable Media for Receiving a Clock Synchronization Message," (Unpublished, filed Dec. 16, 2014).
Commonly-assigned, co-pending U.S. Appl. No. 14/557,418 for "Methods, Systems, and Computer Readable Media for Receiving Test Configuration Information," (Unpublished, filed Dec. 1, 2014).
"UDP hole punching," Wikipedia, http://en.wikipedia.org/wiki/UDP_hole_punching, (Nov. 25, 2014).
Marius Pavel Nistor, "Application Mixes Add New Levels of Realism to IxChariot 8 Network Testing," Ixia, (Aug. 1, 2014).
Notice of Allowance and Fee(s) Due for U.S. Appl. No. 14/619,041 (dated May 9, 2017).
Non-Final Office Action for U.S. Appl. No. 14/572,746 (dated Mar. 7, 2017).
Non-Final Office Action for U.S. Appl. No. 14/619,041 (dated Dec. 16, 2016).
Notice of Allowance and Fee(s) Due for U.S. Appl. No. 14/619,039 (dated Nov. 7, 2016).
Applicant Initiated Interview Summary for U.S. Appl. No. 14/572,746 (dated Jun. 22, 2017).
Communication of European publication number and information on the application of Article 67(3) EPC for European Patent Application No. 16749568.8 (dated Aug. 23, 2017).
Supplemental Notice of Allowability for U.S. Appl. No. 14/572,746 (dated Oct. 5, 2017).
Non-Final Office Action and Fee(s) Due for U.S. Appl. No. 14/557,418 (dated Sep. 27, 2017).
Notice of Allowance and Fee(s) Due for U.S. Appl. No. 14/572,746 (dated Jul. 11, 2017).
Final Office Action for U.S. Appl. No. 14/557,418 (dated May 3, 2018).
Notification of Transmittal of the International Search Report and the Written Opinion of the International Searching Authority, or the Declaration for International Application No. PCT/US2017/051357 (dated Dec. 15, 2017).
Notice of Allowance and Fee(s) Due, Examiner-Initiated Interview Summary, and AFCP 2.0 Decision for U.S. Appl. No. 14/557,418 (dated Jul. 24, 2018).

* cited by examiner

METHODS, SYSTEMS, AND COMPUTER READABLE MEDIA FOR INITIATING AND EXECUTING PERFORMANCE TESTS OF A PRIVATE NETWORK AND/OR COMPONENTS THEREOF

PRIORITY CLAIM

This application claims the benefit of Romanian Patent Application No. A/00994/2014, filed Dec. 16, 2014; the disclosure of which is incorporated herein by reference in its entirety.

TECHNICAL FIELD

The subject matter described herein relates to conducting performance tests of a network and/or components thereof. More specifically, the subject matter relates to methods, systems, and computer readable media for initiating and executing performance tests of a private network and/or components thereof.

BACKGROUND

A private network is a network located behind a firewall/ network address translation (NAT) and/or port address translation (PAT) device. It is desirable to test private network devices located behind a firewall. However, there must be some mechanism for allowing test traffic to traverse the firewall.

If the firewall is performing only NAT functions, then a mapping of a single public IP address to a single private IP address can be created and stored in a NAT table allowing a range of ports to be opened in the firewall. The open ports allow test traffic from the public network IP address to the private IP address to traverse the firewall and reach the destination endpoint. Large numbers of users can be simulated and tested using the open ports in the firewall and addressing traffic to the private IP address. However, opening ports in the firewall creates security issues. In addition, if the firewall also implements port address translation (PAT), port translation must be done by the PAT function for each simulated user so that an entry that maps the public UDP (IP/port) address to the private UDP (IP/port) address must be added to the PAT table. This restriction effectively blocks the running of performance tests where hundreds of users must be simulated to achieve the desired throughput.

Accordingly, a need exists for improved methods, systems, and computer readable media for initiating and executing performance tests of a private network and/or components thereof.

SUMMARY

Methods, systems, and computer readable media initiating and executing performance tests of a private network and/or components thereof are disclosed. According to one exemplary method and at a receiver endpoint in a private network, initiating a transport layer connection with a sender endpoint in a public network. At the sender endpoint in the public network, allocating a port for testing purposes, binding to the port, and sending an Internet Protocol (IP) address and a port number over the transport layer connection. At the receiver endpoint, sending a hole punch datagram from the private network to the public network to create a hole in a firewall that is separating the public and private networks. At the sender endpoint, receiving the hole punch datagram and using IP address and port information in the hole punch datagram for sending test traffic to the receiver endpoint in the private network through the hole in the firewall.

According to one exemplary system for initiating and executing a performance test of a private network and/or components thereof, the system includes a receiver endpoint in a private network and a sender endpoint in a public network. The receiver endpoint is configured to initiate a transport layer connection with the sender endpoint. In response to receiving the transport layer connection, the sender endpoint is configured to allocate a port for testing purposes, bind to the port, and send an IP address and a port number over the transport layer connection. In response to receiving the IP address and the port number, the receiver endpoint is configured to send a hole punch datagram from the private network to the public network to create a hole in a firewall that separates the private network from the public network. In response to receiving the hole punch datagram, the sender endpoint is configured use IP address and port information in the hole punch datagram to send test traffic to the receiver endpoint through the hole in the firewall.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the terms "endpoint" and "node" refer to physical computing platforms including one or more processors, network interfaces, and memory.

As used herein, each of the terms "function" and "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
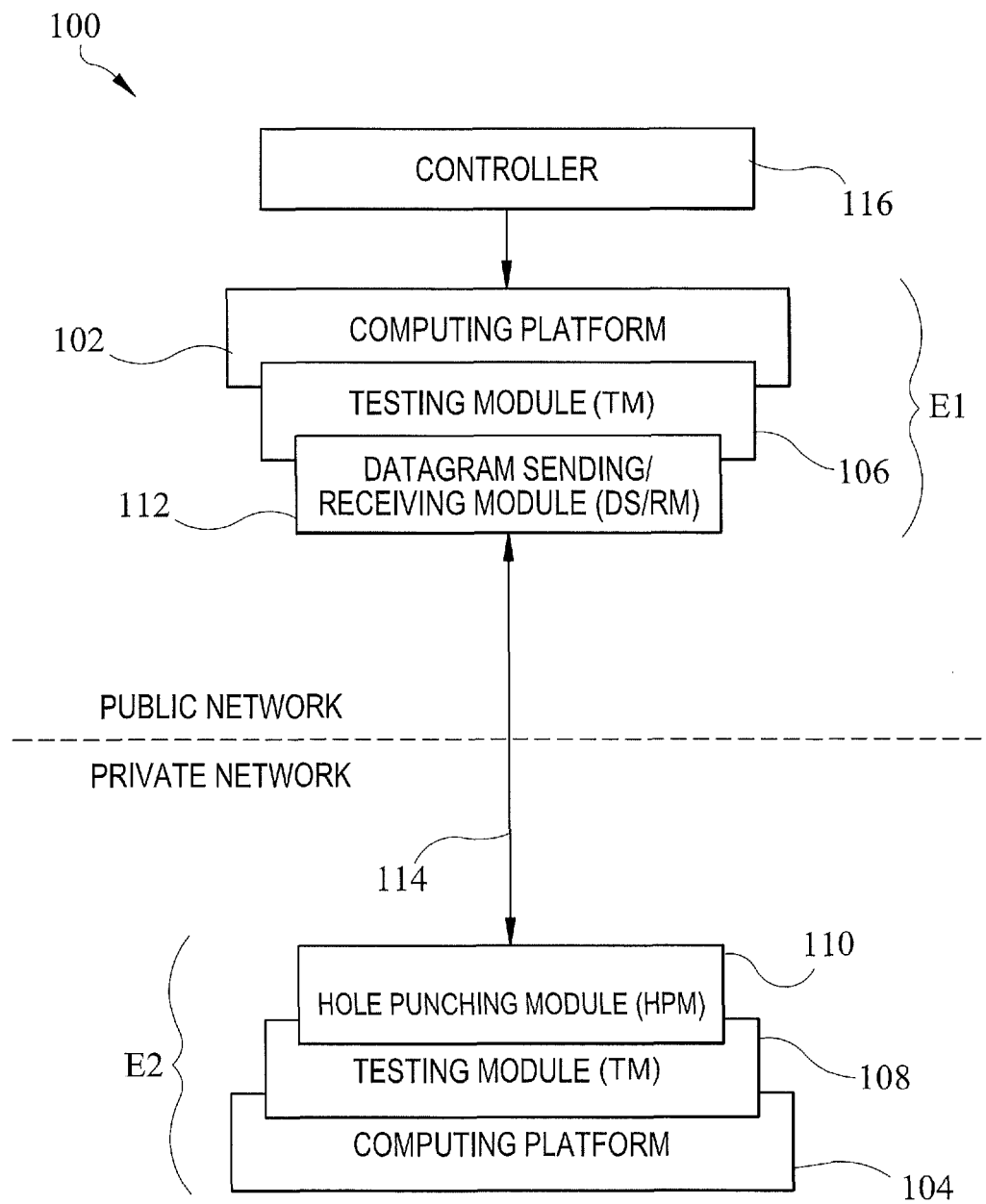
FIG. 1 is a diagram illustrating exemplary computing platforms for initiating and conducting performance tests of a private network and/or components thereof according to an embodiment of the subject matter described herein.

The subject matter described herein includes methods, systems, and computer readable media for initiating and conducting performance tests of a private network and/or components thereof. In accordance with some aspects of the subject matter described herein, performance test datagrams are exchanged between two or more endpoints for testing a private network. The datagrams include source/destination addresses, which, when used in a known (unique) combination will "punch a hole" into the respective private network and across a security device. The security devices is aware that the datagrams having particular source/destination addresses will use the port automatically opened by the punch hole datagram sent from inside node, and allows the datagrams sent from public node to traverse the firewall/PAT without having to manually open any ports. That is, the firewall device intercepts datagram messages and automatically (e.g., as opposed to manually) opens a port which can be reused by a public (e.g., sender) peer to send datagrams back to the inside (e.g., private) peer from where it received the first datagram, and from where the initial datagram originated.

In some embodiments, sender and receiver endpoints communicate test datagrams for measuring and analyzing various network characteristics, communication parameters, and/or statistics for testing purposes. In some embodiments, at least one of the testing endpoints is located in a public network, and at least one other of the testing endpoints is located in a private network. The test datagrams are configured to traverse one or more security related devices (e.g., a firewall device enabled with port address translation (PAT)) between the endpoints (e.g., test traffic generators). Notably, test datagrams can be exchanged between endpoints without having to manually open any ports in the secure firewall device and/or without utilizing PAT to manually create an entry for and/or map each public user datagram protocol (UDP) address (e.g., IP and port address) to each private UDP address for each simulated user. In some embodiments, firewall/PAT device will open a port automatically and it will automatically close the port after a period of time.

Notably, in accordance with some aspects of the subject matter described herein, by communicating datagrams (e.g., having specific combinations of source/destination addresses and/or combinations thereof) between the public and private endpoints, test traffic may be sent without opening ports in a firewall device and/or without mapping address information for each simulated user. In some embodiments, the endpoints may exchange datagrams for testing performance of a private network and/or components thereof (e.g., nodes, servers, the Internet connection, etc.) while minimizing or eliminating modifications to security related devices at the edge of the private network.

When preparing to test network nodes, test operators typically need to provide test configuration information to one or more nodes. The test configuration information may be communicated to one or more endpoints as described in commonly owned, assigned, and co-pending U.S. patent application Ser. No. 14/557,418, filed on Dec. 1, 2014, which claims priority to Romanian Patent Application No. A/00918/2014, which was filed on Nov. 27, 2014, the disclosures of which are incorporated herein by reference in the entireties. The test configuration may include information about a test session, node identification information, address information associated with a configuration system, port information associated with the configuration system, information about one or more inbound peers for one or more nodes associated with the test session, and/or information about one or more outbound peers for one or more nodes associated with the test session.

As used herein, the term "UDP traffic" refers to UDP datagrams including a source Internet Protocol (IP) address, a source port identifier, a destination IP address, and a destination identifier. UDP traffic may include test setup traffic, test execution traffic, hole punching traffic, etc. UDP traffic is used to convey UDP addresses between endpoints in the form of "IP:Port", using IP messages, IP version 4 (v4) messages, IP version 6 (v6) messages, transmission control protocol (TCP) messages, stream control transmission protocol (SCTP) messages, real-time transport protocol (RTP) messages, reliable data protocol (RDP) messages, general packet radio service (GPRS) tunneling protocol (GTP) messages, messages using another tunneling protocol, and/or any variations thereof. UDP datagrams allow test packets (test traffic) to traverse a firewall/PAT without manually opening ports in the firewall/PAT and without having to manually map public UDP addresses to private UDP addresses for each simulated user.

As used herein, the phrase "punching a hole", or a similar version thereof, refers to sending a datagram having unique or specific source and destination addresses so that a security device may be bypassed for running performance tests and streaming traffic across the security device (e.g., a firewall/PAT) without any change in configuration of the security device, without manually opening any ports associated with the security device, and/or without any reference to a specific destination mapping (e.g., public to private ports) in the test configuration. The security device may recognize that certain source/destination combinations are indicative of setting up or executing a test, and the security device will route the datagrams to the intended recipient without having to manually open a port. This renders the entire test process completely transparent for an application user.

As user herein, the terms "sender", "public endpoint" and "E1" are synonymous and refer to a node residing in a public network. As used herein, the terms "receiver", "private endpoint" and "E2" are synonymous and refer to a node residing in a private network that is to be tested. E1 and E2 may be referred to as "peers" in a testing environment.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an exemplary system 100 for initiating and executing performance tests of a private network and/or components thereof. In some aspects, system 100 includes at least a first node or endpoint E1 and a second node or endpoint E2 provided within public and private networks, respectively, for generating, sending, and/or receiving test traffic according to an embodiment of the subject matter described herein.

Referring to FIG. 1, first endpoint E1 may reside in a public network and include a first computing platform 102 and second endpoint E2 may reside in a private network and include a second (different) computing platform 104. First and second computing platforms 102 and 104, respectively, are each configured to generate, send, and/or receive test traffic (e.g., test datagrams) after an initial setup phase for testing (e.g., monitoring and/or measuring) characteristics, parameters, statistics, etc. associated with the private network and/or component thereof.

In some embodiments and during an initial set up phase, initiating "INIT" and acknowledgement "ACK" datagrams are exchanged between E1 and E2 to indicate that a performance test is to be executed. The INIT and ACK datagrams include specific combinations of source and destination addresses which indicate to a security device the address of the intended receiver located behind the security device. Rather than mapping each sender and receiver addresses separately, the security device is PAT enabled to replace the private IP/port address of E2 with its respective automatic allocated public IP/port address. This allows the test traffic to traverse the security device without having to manually open ports. It also simplifies test execution where multiple users are simulated. In some embodiments, performance tests are run without having to alter or configure the security device (e.g., a firewall/PAT) between the public and private networks and/or without having to provide mapping to specific ports in the test configuration.

In some embodiments, performance tests may be initiated by spawning one or more thread(s) from a controller to the intended test traffic sender to execute setup for each simulated user. Threads represent one or more services, applications, or processes (e.g., software executing on a processor) for establishing connections and/or providing test configuration information to each endpoint and/or for each simulated user. In some embodiments, one setup thread may be associated with a particular endpoint (e.g., E1, E2, etc.) or a particular test session between endpoints. For example, a first setup thread may process connection requests associated with first endpoint E1, and a second setup thread may process connection requests associated with an endpoint E2. In some embodiments and upon receiving a setup thread, second endpoint E2 may be configured to initiate and communicate test packets or data to first endpoint E1 upon receiving the INIT datagram from E2.

In some embodiments, first and second computing platforms 102 and 104 represent network devices, for example, network modules, nodes, or a system of devices, nodes, and/or modules. In some embodiments, first and second computing platforms 102 and 104 include a single node. In other aspects, first and second computing platforms 102 and 104 include testing functionality distributed across multiple computing platforms and/or nodes. In some aspects, first computing platform 102 includes a testing platform in a public network. In some aspects, second computing platform 104 includes an endpoint located in a private network (e.g., enterprise network) behind one or more security related devices, such as a firewall/PAT device (e.g., FIG. 2) that is configured to provide security for the private network. Notably, first and second endpoints E1 and E2, respectively and respective computing platforms are configured to stream test traffic across the security device, without having to manually configure the device and/or manually open up ports in the security device via exchanging datagrams having specific source/destination addresses.

In some embodiments, computing platforms 102 and 104 include test traffic generators configured to generate, send, and/or receive testing datagrams according to a test configuration. Notably, the test configuration is devoid of specific destination (e.g., public and private) ports, thereby obviating the need for excessive mapping or port translation via an intervening security device (e.g., firewall/PAT). During setup, each endpoint E1 and E2 will allocate and bind to a specific port, and send each of the INIT, ACK, and test datagrams using those bound ports. The security device will know to replace its respective IP/port information with the private endpoint IP/port information, and vice versa, upon receiving the INIT, ACK, and test datagrams.

In some aspects, computing platforms 102 and/or 104 are configured to emulate multiple users for testing performance characteristics of the private network. Second computing platform 104 may "punch a hole" in the security device (e.g., firewall/PAT, FIG. 2) serving the private network and each endpoint may then use the "hole" to transmit test traffic. In some embodiments, first computing platform 102 is configured to generate, send, and/or receive test traffic for emulating a web server, a user device, multiple web servers, and/or multiple devices. Second computing platform 104 is configured to measure network statistics, performance characteristics, and/or generate and report performance data associated with test packets received in the private network.

In some embodiments, first and second computing platforms 102 and 104, respectively, each include a testing module (TM). For example, first computing platform 102 includes a first TM 106 and second computing platform 104 includes a second TM 108. First and second TMs 106 and 108, respectively, (e.g., and/or portions thereof) are configured to generate, send, and/or receive test traffic (e.g., packets or datagrams) according to test configuration information. In this example, after receiving the test configuration information, second endpoint E2 may "punch" a "hole" in a firewall/PAT device (FIG. 2) via a hole punching module (HPM) 110. Similarly, after receiving test configuration information, first computing platform 102 may generate, send, and/or receive test traffic (e.g., execute a performance test) via communicating test data using a datagram sending and receiving module (DS/RM) 112.

Notably, test configuration information received at each endpoint is devoid of specific destination/port addresses, which eliminates the need for manual mapping. Rather, HPM 110 generates datagrams having specific combinations of a source and destination that are associated with test traffic so that the traffic will flow along a data path or hole 114 that is created according to an INIT datagram (e.g., a UDP datagram) generated at and communicated from the private endpoint (e.g., E2). In some embodiments as described further below, hole 114 includes a flow path between peers (e.g., E1, E2) in which one address is used for each simulated user. By using the single address as a source or destination address, and a combination of specific source addresses (UDPs), different ports may be allocated in the private space for simulating different users and conducting multiple concurrent tests of the private network.

Figure 2:
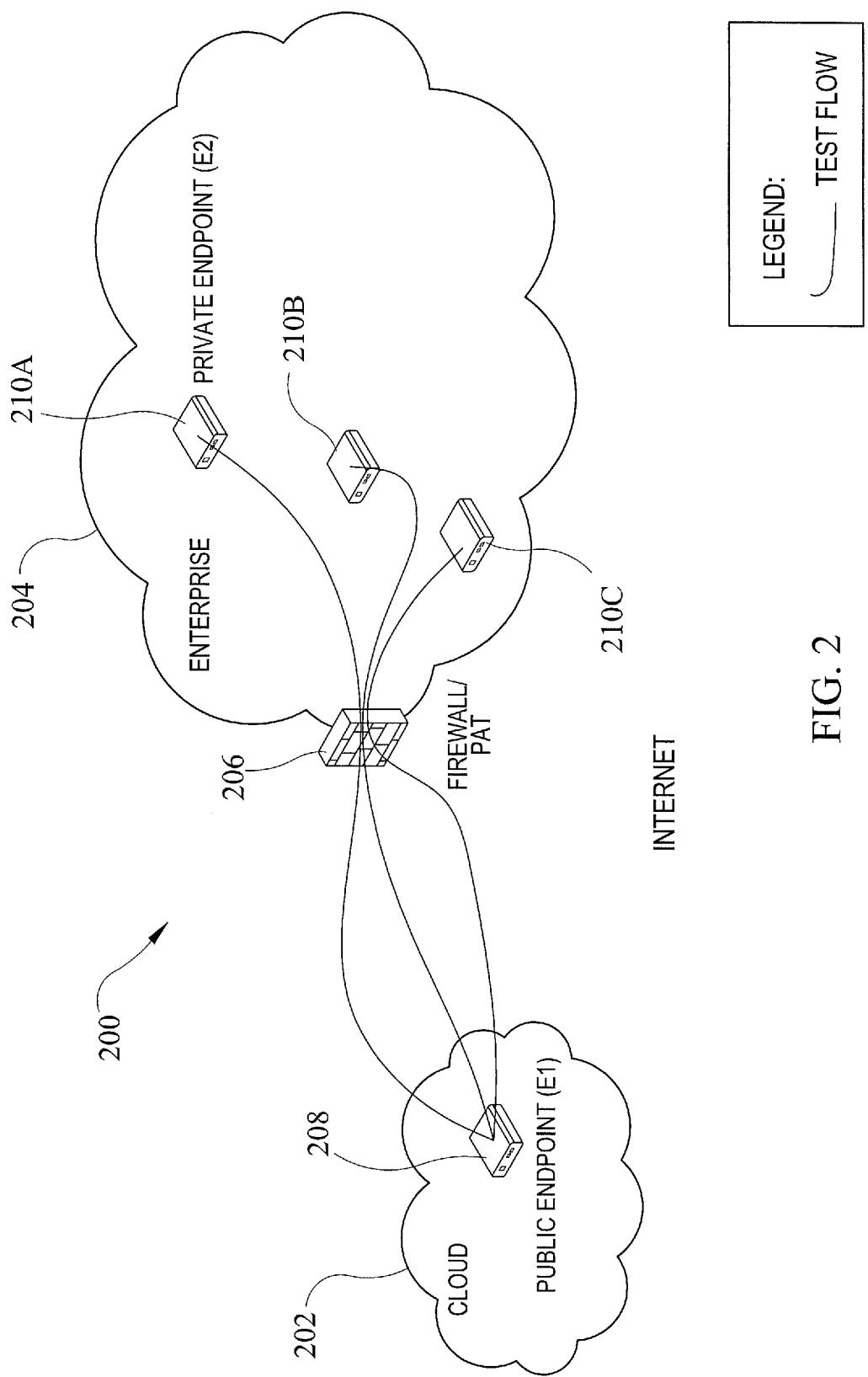
FIG. 2 is a diagram illustrating an exemplary environment for initiating and conducting performance tests of a private network and/or components thereof according to an embodiment of the subject matter described herein.

In some embodiments, HPM 110 generates outbound UDP traffic to initiate RTP streaming of test traffic from first (public) endpoint E1 to second (private) endpoint E2 without opening a port in the intervening firewall and/or performing significant (specifically configured) port address translation. HPM 110 is configured to generate a datagram for punching a hole in the firewall/PAT whereby hundreds of users may be simulated via RTP streaming, without having any explicit configuration made available to the intervening firewall/PAT device (FIG. 2).

In some embodiments, HPM 110 and DS/RM 112 include any suitable entity or entities (e.g., a computing platform, software executing on a processor, a logic device, a complex programmable logic device (CPLD), a field-programmable gate array (FPGA), and/or an application specific integrated circuit (ASIC)) for performing one or more aspects associated with generating, sending, receiving, communicating, exchanging, and/or streaming test traffic or test datagrams. HPM 110 and DS/RM 112 may each IP address and port combinations as sources/destinations for test data or test information. For example, communications to/from (e.g., between) first and second endpoints E1 and E2 of system 100 may occur using different IP/port addresses depending on the associated test or network node. In some aspects, multiple users may be emulated using various IP address/port combinations between endpoints in the public and private networks. For example, E2 may send test traffic for simulating multiple users and send traffic for multiple users over the network.

Still referring to FIG. 1 and in some embodiments, HPM 110 of second endpoint E2 is configured to initiate one or more performance tests by generating and sending an "INIT" datagram to first endpoint E1. The datagram may include private IP address information and private port address information associated with the bound port. The security device will receive the INIT datagram and replace the private IP/port address information in the INIT datagram with the IP/port address of the public side of the security device, thus, a hole is created through the security device. This allows E1 to direct traffic to one public address/port (e.g., associated with the public side of the firewall) which the security device then replaces with the private IP address/port of the bound port, by simply switching the destination address to the source address) for testing purposes. Communications between E1 and E2 include specific source/destination combinations which obviates the need to open a port in a firewall/PAT device, while also obviating the need for PAT to map information for each simulated user. In some embodiments, DS/RM 112 is configured to receive the INIT datagram signaling the start of one or more tests from HPM 110 and then use the UDP address information associated with the signaling the datagram to acknowledge and initiate a performance test via generating and sending test traffic.

HPM 110 and DS/RM 112 may each include one or more communications interfaces for sending and receiving various test traffic including IP messages, v4 messages, v6 messages, TCP messages, SCTP messages, RTP messages, RDP messages, GTP messages, or versions thereof. HPM 110 and DS/RM 112 may represent any suitable entity (e.g., a non-transitory computer readable medium or a memory device) for generating, sending, and/or receiving message flows, messages, test traffic, test results, statistics, and/or any test related information.

In some embodiments, system 100 is operable to setup a test, punch a hole in the firewall/PAT via a UDP datagram, and initiate data streaming between multiple public/private endpoints for executing a performance test and simulating multiple users of a private network. Computing platforms 102 and 104 may communicate test traffic (e.g., directly and/or indirectly) along a flow path or hole 114. Hole 114 is shown as a physical path for illustration purposes only, and solely for purposes of indicating that a UDP communication path exists between endpoints. In some aspects, hole 114 includes a communication path that is directly between first and second endpoints E1 and E2 (e.g., indicative of computing platforms 102 and 104 that directly communicate), and devoid of intervening signaling nodes. In other aspects, a plurality of signaling nodes may be disposed along the path between endpoints E1 and E2 for facilitating indirect data streaming between endpoints E1 and E2 and/or components (e.g., modules) thereof.

As FIG. 1 further illustrates and in some embodiments, a user (e.g., or an automated system controlled by a user) may select and send a test configuration to first endpoint E1 using a controller 116. Controller 116 may also control (e.g., start, pause, and/or stop) aspects of the performance test using one or more test control commands (e.g., threads) communicated therefrom.

It will be appreciated that FIG. 1 is for illustrative purposes and that various nodes, locations thereof, and/or functionality thereof described above in relation to FIG. 1 may be changed, altered, added, or removed. For example, some nodes and/or functionality may be combined into a single entity without departing from the scope of the instant subject matter.

FIG. 2 is a diagram illustrating an exemplary network environment 200 for initiating and executing performance tests of a private network and/or components thereof according to an embodiment of the subject matter described herein. Referring to FIG. 2, exemplary environment 200 may include a cloud network 202 having a public endpoint connected to a private endpoint within an enterprise (private) network 204 via the Internet or other public network. A firewall/PAT device 206 is disposed between endpoint components of the respective cloud network 202 and enterprise network 204.

At least one public endpoint 208 or node (e.g., computing platform 102) may be disposed within cloud network 202 for testing multiple private endpoints 210A, 210B, 210C, etc., or nodes within enterprise network 204. Public endpoint 208 represents a node (e.g., computing platform 102) having a TM (e.g., 106, FIG. 1) and a DS/RM (e.g., 112, FIG. 1) configured to generate and/or send test traffic to one or more endpoints in the private network, according to a test configuration for emulating a plurality of users. That is, one public endpoint 208 may emulate a plurality of users for testing a plurality of private endpoints 210A to 210C. Public endpoint 208 may also receive test traffic back from endpoints 210A to 210C in the private network, where configured to do so. Endpoints 208 and 210A to 210C may include any hardware in combination with software, for example, computing platforms, processor(s), memory, testing modules stored thereon and executed thereby, and/or servers.

In some embodiments, private endpoints 210A to 210C represent nodes (e.g., computing platform 104) including HPMs (e.g., 110, FIG. 1) and/or similar functionality for generating and sending INIT datagrams configured to specify a "hole" or path around firewall/PAT 206 without having to open any ports and/or specifically configure firewall/PAT 206 with specific mapping information.

Cloud network 202 may include a test network configured to emulate multiple public users via at least one node 208. Node 208 is configured to initiate a performance test, stop a test, and/or otherwise interact with one or more test operators (e.g., via controller 116, FIG. 1) in front of firewall/PAT 206. Enterprise network 204 includes multiple nodes or endpoints 210A to 210C disposed behind firewall/PAT 206 for collecting, analyzing, and reporting performance data or information regarding communication parameters and/or communication characteristics associated with enterprise network 204.

Firewall/PAT 206 may include any security related device, such as a firewall device that is enabled to perform PAT. Firewall/PAT 206 may block, alter, and/or discard some communications, while allowing those having specific source/destination UDP address pass through. For example, firewall/PAT 206 may discard or block incoming connection requests from all nodes located in an outside network. As described herein, certain test traffic that is directed to a public address associated with the public side of firewall/

PAT 206 and from a specific source address (e.g., of node 208) may be routed past firewall/PAT 206 upon receipt. Firewall/PAT 206 will replace its respective IP/port information with that of the private endpoint (e.g., 210A to 210C). In some embodiments, traffic directed to a single UDP address corresponding to the public side of firewall/PAT 206 may be mapped to multiple private endpoints 210A to 210C without having to map each public endpoint to the multiple different private endpoints.

In some embodiments, a hole or path across firewall/PAT 206 may only be initiated by generation of INIT datagrams from nodes located inside private enterprise network 204 (e.g., 210A to 210C), since security related devices (e.g., one or more firewall/PATs 206) may allow outbound traffic to flow freely while preventing certain inbound traffic. In such embodiments, endpoints 210A to 210C in private enterprise network 204 may only receive test traffic from public endpoint 208 via generation of outbound connections initiated by private endpoints 210A to 210C. Private endpoints 210A to 210C may be configured to test, analyze, measure, and/or report connectivity or communication statistics associated with the security device (e.g., firewall/PAT 206), the Internet connection, communications from public or private servers, connection speed, reliability of enterprise network 204, etc.

It will be appreciated that FIG. 2 is for illustrative purposes and that various nodes, locations thereof, and/or functions thereof described above in relation to FIG. 2 may be changed, altered, added, or removed. For example, some nodes and/or functions may be combined into one entity or separated into a multiple entities.

Figure 3A:
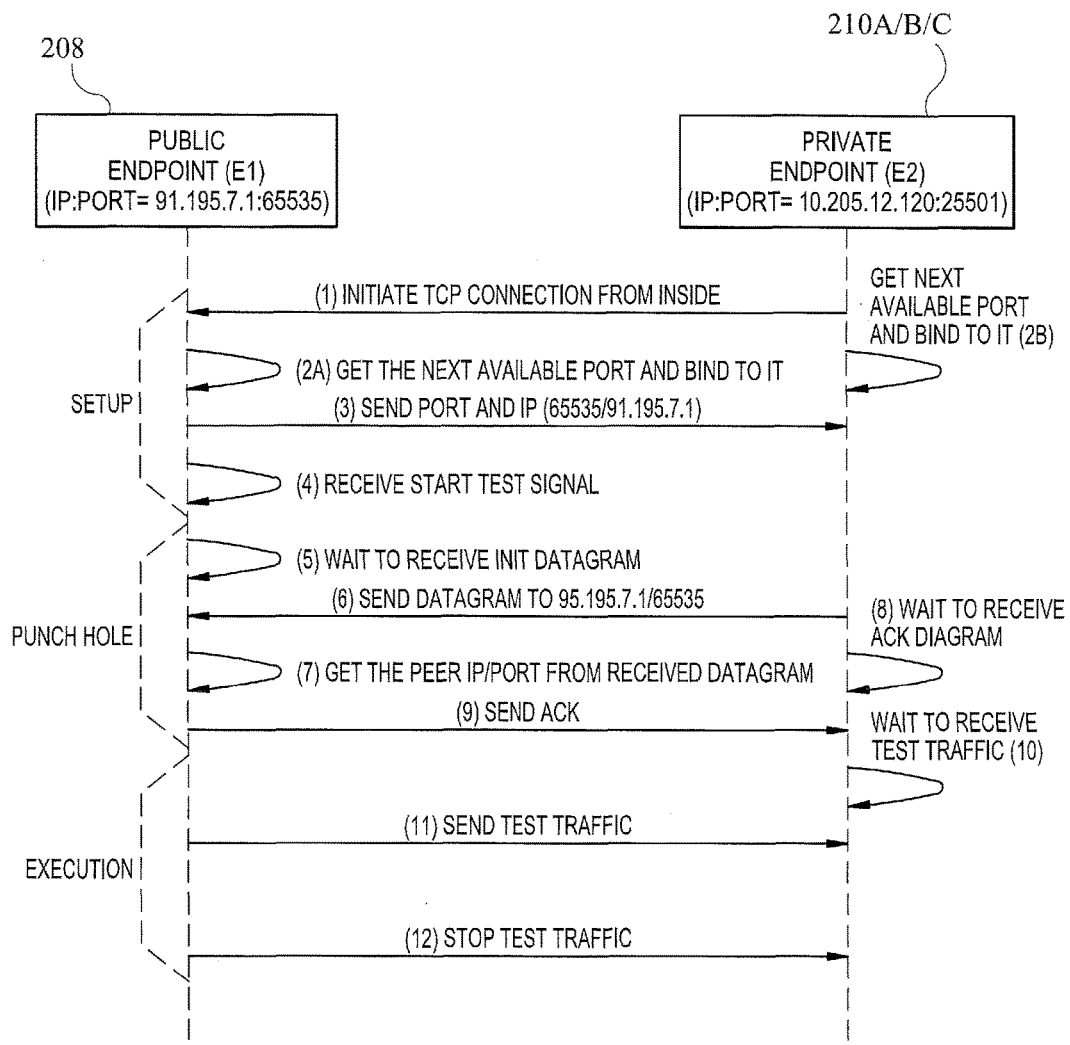
FIGS. 3A and 3B are diagrams illustrating exemplary peer communications for initiating and executing performance tests of a private network and/or components thereof according to an embodiment of the subject matter described herein.
Figure 3B:
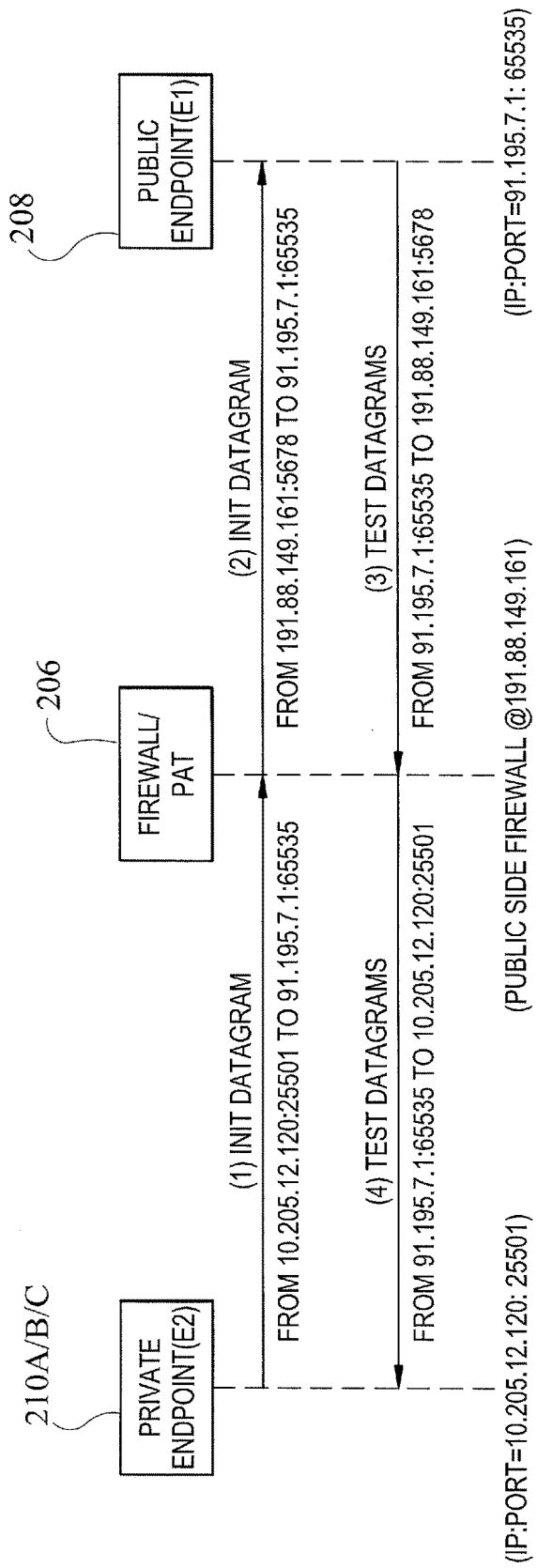

FIGS. 3A and 3B are message flow diagrams illustrating exemplary communications between public and private endpoints (e.g., peers) for initiating and executing performance tests of the private network and/or components thereof. In some aspects, FIGS. 3A and 3B illustrate aspects of a private endpoint punching a hole within the private network and/or security devices associated therewith (e.g., firewall/PAT) for allowing inbound streaming of test traffic.

Referring to FIG. 3A, at step 1, a transport layer connection (e.g., TCP connection) is initiated and sent from a private endpoint E2 (e.g., 210A to 210C residing in a private network) to a public endpoint E1 (e.g., 208, residing in a public network). Private endpoint (E2) is represented by a private UDP IP/port address of 10.205.12.120:25501 (i.e., indicative of the private IP address of 10.205.12.120 and private port identifier of 25501). Public endpoint (E1) is represented by a public UDP address of 91.195.7.1:65535 (i.e., indicative of a public IP address of 91.195.7.1 and a public port identifier of 65535). Each UDP packet may be comprised of numeric combinations including any suitable IP address (e.g., any numerical label assigned to the device, such as the endpoint or node and respective computing platform) and any suitable port identifier (e.g., a five digit numeric label or identifier), optionally separated by a colon (e.g., a ":"). Specific UDP communications having specific source/destination addresses may traverse a security device and enter the private network. Notably, first TCP communication at step 1 is allowed to traverse firewall/PAT (e.g., 206, FIG. 2) by virtue of being generated in the private network. First TCP communication at step 1 is not blocked or otherwise hindered by a security device associated with the private network.

At steps 2A and 2B, each endpoint allocates an available port, and binds to it. All test traffic will be sent from the respective ports to which each endpoint (e.g., E1 and E2) binds. In addition to this, INIT and ACK datagrams will be sent from the respective port to which each endpoint is bound.

At step 3, public endpoint E1 sends a UDP datagram to private endpoint E2. The UDP datagram contains an IP address and a port number that public endpoint E1 will use for testing. The IP address and the port number are communicated using a UDP datagram in which a source IP address field stores the IP address that public endpoint E1 is bound to and a source port field stores the port number of the public endpoint E1.

At step 4, public endpoint E1 receives a start test signal. This may be communicated from a user or test operator via a controller (e.g., 116, FIG. 1). Steps 1 to 4 complete an initial setup phase (e.g., test initiation) associated with a respective test session. During the setup phase, public endpoint E1 allocates an available UDP port and binds to it to block other applications from using it during testing. Public endpoint E1 later discovers its UDP (e.g., from controller 116, FIG. 1) and waits for a signal (e.g., INIT datagram) to initiate testing.

At step 5, public endpoint E1 waits to receive an INIT datagram from private endpoint E2, in which E2 notifies E1 that a hole has been punched through into the private network.

At step 6, private endpoint E2 sends a UDP datagram to public endpoint E1. This datagram is the INIT datagram and includes a specific source/destination address, which is allowed to traverse the firewall/PAT because it originates from the private network. Upon encountering the firewall/PAT, the firewall/PAT knows to replace the private IP/port address information with a public IP address and port number. The firewall/PAT also stores a mapping between the private IP address and port number of private endpoint E2 and public IP address and port number that it assigns in its mapping table. The creation of this mapping in the mapping table of the firewall/PAT opens a hole in the firewall/PAT for packets addressed to the public IP address and port number in the INIT datagram.

At step 7, public endpoint E2 receives the public IP/port information from the received INIT datagram.

At step 8, the private endpoint E2 waits to receive the ACK datagram from public endpoint E1, which indicates that the test session has been initiated and acknowledged.

At step 9, public endpoint E1 sends an ACK datagram to private endpoint E2. Steps 5 to 9 are indicative of a hole punching phase of a given performance test. In the case where datagrams are not synchronized to the same clock, public endpoint E1 is configured to buffer datagrams received from public endpoint E2 and recover INIT datagrams where necessary. Thus, synchronization between endpoints E1 and E2 does not prohibit initiating and/or executing performance testing of a private network and/or components thereof where multiple users are simulated or emulated.

At step 10, private endpoint E2 waits to receive test traffic. At steps 11 and 12 test traffic is sent from public endpoint E1 to private endpoint E2, and stopped according to a test configuration. Steps 10 to 12 are indicative of an execution phase of a performance test.

FIG. 3B is a message flow diagram illustrating the hole punch phase and a test phase in more detail. Referring to FIG. 3B, in step 1, private endpoint E2 generates and sends an INIT datagram from its respective private UDP address to the respective public UDP address of public endpoint E1. The INIT datagram is configured to punch a hole into the private network upon receipt at firewall/PAT 206. Firewall/

PAT 206 intercepts the INIT datagram, and replaces the private source UDP information with its own public UDP information corresponding to the public IP/port on the public side of firewall/PAT 206. Firewall/PAT 206 also creates the mapping between the private IP address and port number and the assigned public IP address and port number and stores the mapping in its mapping table.

In step 2, the INIT datagram is sent to public endpoint E1. As seen in message 2, the source address of private endpoint E2 is replaced with that of the public side of firewall/PAT 206.

In step 3, public endpoint E1 begins sending test datagrams (e.g., test traffic). Public endpoint E1 may initiate starting and/or stopping of traffic upon a signal from a controller (e.g., 116, FIG. 1) or user. The test traffic at step 3 is destined for the IP/port address associated with firewall/PAT 206. Upon receipt of test traffic at firewall/PAT 206, the UDP source address of firewall/PAT 206 is replaced with the IP/port address of private endpoint E2.

In step 4, test datagrams are received at private endpoint E2 as a result of firewall/PAT 206 being instructed to replace its public UDP address with the UDP of private endpoint E2. Firewall/PAT 206 no longer needs to perform PAT functionality for each endpoint but only for datagrams having the destination address and port corresponding to the public address and port assigned by the firewall in step 1 of FIG. 3B and the source IP address and port of the sending endpoint communicated to the private endpoint over the TCP connection.

It will be appreciated that the communications depicted in FIGS. 3A and 3B are for illustrative purposes, and that different and/or additional actions may be used. It will also be appreciated that various actions described herein may occur in simultaneously and/or in a different order or sequence.

Figure 4A:
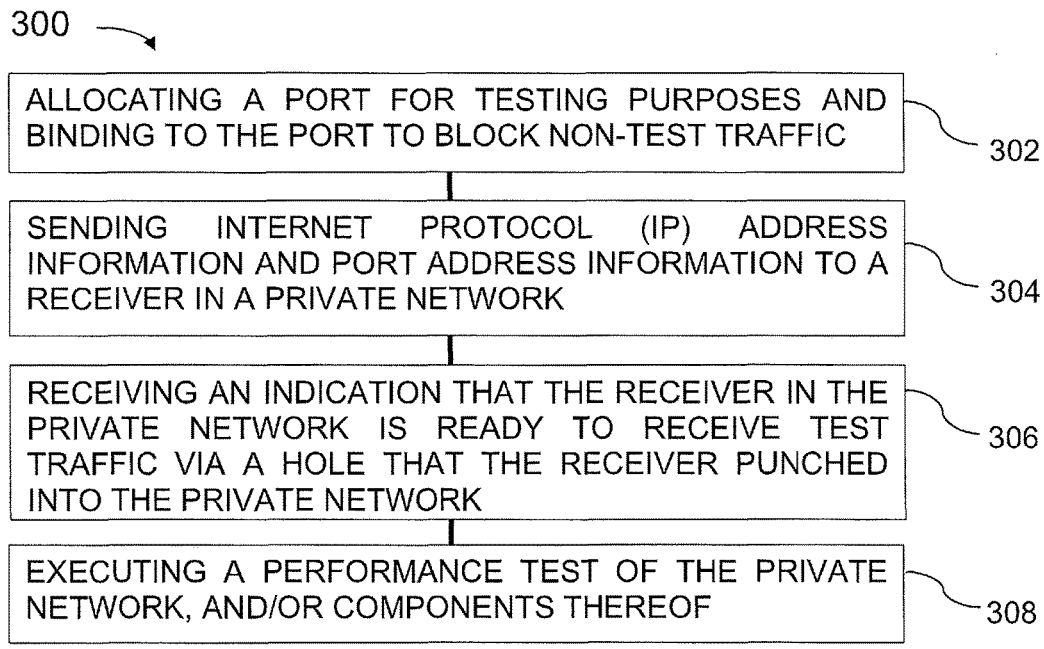
FIGS. 4A and 4B are diagrams illustrating exemplary processes for initiating and conducting performance tests of a private network and/or components thereof according to an embodiment of the subject matter described herein.
Figure 4B:
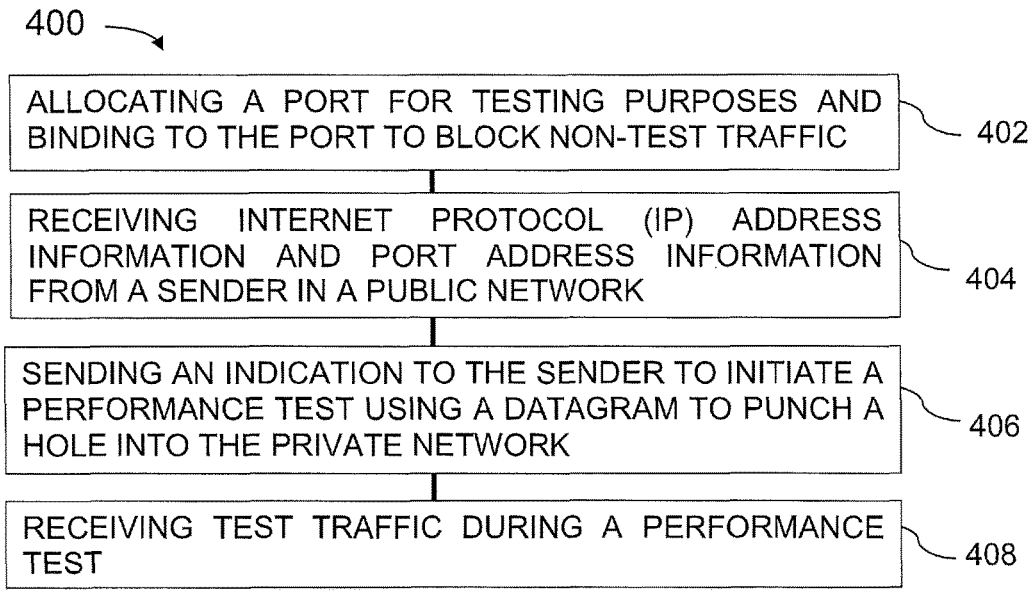

FIGS. 4A and 4B are diagrams illustrating exemplary processes performed at each endpoint or node (e.g., E1 and E2) within a test environment (e.g., FIG. 2).

Referring to FIG. 4A, an exemplary process, generally designated 300 is performed at a sender or public endpoint (e.g., E1) during setup and execution of a performance test.

During a setup phase and at block 302, the sender requests an available UDP port for testing purposes (e.g., from an operating system and/or controller), and binds to it to block other applications from using the allocated port. The sender will use this port to send and receive an ACK datagram and all test traffic for emulating multiple users.

In block 304, the sender will send its respective IP address information (e.g., which may be discovered from a controller) and the bound port address information to the receiver peer on the TCP connection which was sent from the receiver in a private network, and which the sender accepted. After sending the UDP address to the receiver, the sender may wait for a signal to start a performance test from a controller. After the signal is received, the sender will wait for an INIT datagram from E2 on the bound port as the signal that the "punch hole" was created by E1.

In block 306, the sender receives an indication that the receiver in the private network is ready to receive test traffic via a hole that the receiver punched into the private network. The indication may include an INIT datagram having a specific source/destination combination. In some embodiments, the sender receives the INIT datagram from the receiver in the private network. The INIT datagram may include a UDP address to which sender may send or direct test traffic. The INIT datagram may instruct the sender to begin a performance test, as the private network is opened and a hole is punched through to the receiving node in the private network.

In block 308, a performance test is executed by sending test traffic from the sender to the receiver. After the INIT datagram is received, the sender may use the source UDP address (IP/Port address) from the received datagram as a destination UDP address on the test datagrams it sends to the receiver peer. In some aspects, the UDP address for the test datagrams is the UDP address corresponding to a public side of a firewall. The firewall may perform PAT to send the test datagrams to the private receiver node. Thus, one UDP address can be used to execute regular streaming traffic which consists of sending UDP/RTP datagrams to the receiver according to a test configuration.

Referring to FIG. 4B, an exemplary process, generally designated 400 is performed at a receiver or private endpoint (e.g., E2) during setup and execution of a performance test.

In block 402 (the setup phase), the receiver will pick up the next available port and bind to it. This will be port on which the receiver will receive an ACK datagram, acknowledging the beginning of the performance test, and all subsequent test datagrams sent from the sender.

In block 404, the receiver will receive the IP/Port address information used by the sender. In some aspects, the receiver sends this information during a setup phase, before a hole is punched.

In block 406 (e.g., the execution phase), the receiver will punch a hole into the private network upon generating and sending an INIT datagram to the sender. The INIT datagram has a destination UDP address corresponding to the IP/Port address information received from the sender during the setup phase. The INIT datagram will have a source address corresponding to the receivers own local IP and the port it bound to locally. This information may be sent in an INIT datagram from the receiver to the sender.

After sending the INIT datagram, the receiver may then wait for an ACK datagram from the sender, so that the receiver knows that the sender peer received the INIT datagram. The sender and receiver do not require synchronization and/or processes requiring synchronization steps. To overcome any potential issues associated with the INIT datagram not being received at sender, the sender will bind to the port immediately after requesting the port from the controller during the setup phase and before it sends the IP/Port address information to the receiver in the private network. Once the socket is bound, any received datagrams will be stored in a socket buffer until the sender can extract it using a receive method on socket API.

In block 408 and after the "hole" was created, the receiver goes to the execution phase where it receives test datagrams from the sender and measure various performance statistics associated with the network, components thereof (e.g., security devices), and/or the Internet serving the private network.

In some embodiments, the methods in FIGS. 4A and 4B assure that a source port set by the firewall in the INIT datagram that it sends to the sender is also used by the sender to the future datagrams it will send back. In some embodiments, the sender may infer a UDP destination address of future test datagrams that it will send to the receiver from a specific UDP source address. In some embodiments, the sender uses its local IP/Port to which it is bound as a source address for all test traffic.

Figure 5:
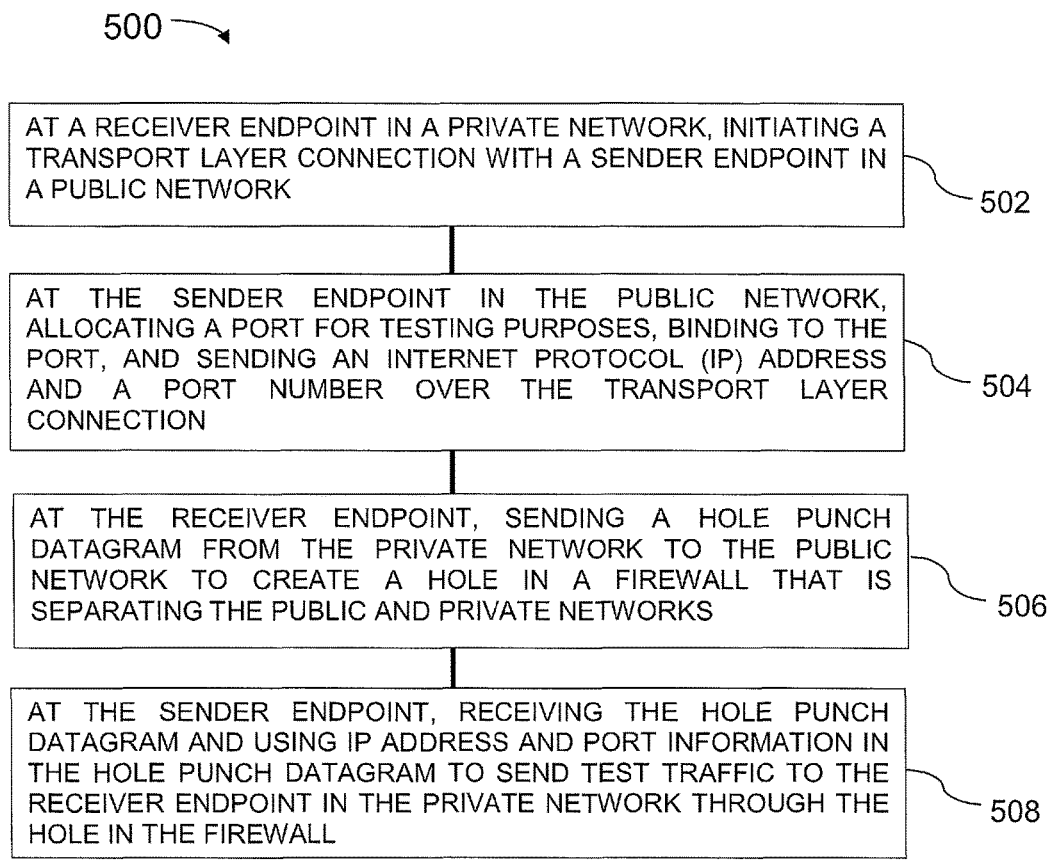
FIG. 5 is a diagram illustrating an exemplary process for initiating and conducting performance tests of a private network and/or components thereof according to an embodiment of the subject matter described herein.

Referring to FIG. 5, an exemplary process, generally designated 500 is provided for initiating and executing a performance test of a private network and/or components thereof, the method comprising.

In block 502 and at a receiver endpoint in a private network, a transport layer connection is initiated with a sender endpoint in a public network.

In block 504 and at the sender endpoint in the public network, a port is allocated for testing purposes, the sender endpoint binds to the port and then sends an IP address and a port number over the transport layer connection.

In block 506 and at the receiver endpoint, a hole punch datagram is sent from the private network to the public network to create a hole in a firewall that is separating the public and private network.

In block 508 and at the sender endpoint, the hole punch datagram is received and the sender sends test traffic using IP address and port information in the hole punch datagram. The test traffic goes through the hole in the firewall.

It should be noted that computing platforms (e.g., 102 and 104, FIG. 1), nodes (e.g., E1, E2, etc.), and/or functionality described herein may constitute special purpose computing devices. Computing platforms (e.g., 102 and 104, FIG. 1), nodes (e.g., E1, E2, etc.) and/or functionality described herein can improve the technological field of testing a private network and/or components thereof by providing mechanisms for running performance tests within inbound streaming traffic over a security device by simulation of a large number of users without any change in configuration of the security device, and without any reference to specific destination public/private portions in the test configuration. This advantageously provides a testing process that is completely transparent for an application user. It provides several advantages (e.g., improved security, efficient testing, etc.) for the enterprise testing market.

The subject matter described herein for receiving test configuration information improves the functionality of test platforms and/or test tools by providing mechanisms for communicating test configuration information to nodes in a private network (e.g., nodes behind a firewall device and/or NAT device) without requiring additional ports to be opened or address translation. It should also be noted that a computing platform that implements subject matter described herein may comprise a special purpose computing device (e.g., a traffic generator) usable to receive test configuration information.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for initiating and executing a performance test of a private network and/or components thereof, the method comprising:

providing, by a test controller, test configuration information for configuring a performance test to a receiver endpoint in a private network and to a sender endpoint in a public network, wherein the test configuration information received at each endpoint is devoid of destination port addresses for receiving traffic from the other endpoint;

at the receiver endpoint in a private network, initiating a transport layer connection with the sender endpoint in a public network;

at the sender endpoint in the public network, allocating a first port for testing purposes, binding to the first port, and sending an Internet Protocol (IP) address and a port number associated with the first port over the transport layer connection to the receiver endpoint;

at the receiver endpoint, allocating a second port for testing purposes, binding to the second port, and sending an IP address and a port number associated with the second port in a hole punch datagram from the private network to the public network to create a hole in a firewall that is separating the public and private networks, wherein the hole punch datagram comprises a User Datagram Protocol (UDP) datagram in which a source IP address field stores the IP address and a source port field stores the port number associated with the second port; and at the sender endpoint, receiving the hole punch datagram and using the IP address and port information in the hole punch datagram to send test traffic to the receiver endpoint in the private network through the hole in the firewall.

2. The method of claim 1, wherein allocating the first port for testing purposes includes requesting the first port from an operating system.

3. The method of claim 1, wherein the hole punch datagram comprises a User Datagram Protocol (UDP) INIT datagram.

4. The method of claim 3, wherein the INIT datagram includes a public IP address and a public port number mapped by the firewall to a private IP address and a private port number of the receiver endpoint for receiving test traffic.

5. The method of claim 4, wherein sending the test traffic includes addressing the test traffic to the public IP address and the public port number, wherein the firewall receives the test traffic, maps the public IP address and public port number to the private IP address and the private port number, and sends the traffic to the receiver endpoint.

6. The method of claim 1, wherein sending the test traffic includes simulating multiple users and sending traffic for the multiple users.

7. The method of claim 1, wherein sending the test traffic includes testing an Internet connection, a security device, and/or connections within the private network.

8. The method of claim 1, wherein a performance test is executed without manually opening a port in the firewall associated with the private network.

9. A system for initiating and executing a performance test of a private network and/or components thereof, the system comprising:

a receiver endpoint in a private network;

a sender endpoint in a public network; and a test controller configured to provide test configuration information for configuring a performance test to a receiver endpoint in a private network and to a sender endpoint in a public network, wherein the test configuration information received at each endpoint is devoid of destination port addresses for receiving traffic from the other endpoint;

wherein the receiver endpoint is configured to initiate a transport layer connection with the sender endpoint;

wherein, in response to receiving the transport layer connection, the sender endpoint is configured to allocate a first port for testing purposes, bind to the first port, and send an Internet Protocol (IP) address and a port number associated with the first port over the transport layer connection to the receiver endpoint;

wherein, in response to receiving the IP address and the port number, the receiver endpoint is configured to allocate a second port for testing purposes, bind to the second port, and send an IP address and a port number associated with the second port in a hole punch datagram from the private network to the public network to create a hole in a firewall that separates the private network from the public network, wherein the hole punch datagram comprises a User Datagram Protocol (UDP) datagram in which a source IP address field stores the IP address and a source port field stores the port number associated with the second port; and wherein, in response to receiving the hole punch datagram, the sender endpoint receives the hole punch datagram and uses the IP address and port information in the hole punch datagram to send test traffic to the receiver endpoint in the private network through the hole in the firewall.

10. The system of claim 9, wherein the sender endpoint allocates the first port for testing purposes by requesting the first port from an operating system.

11. The system of claim 9, wherein the hole punch datagram comprises a User Datagram Protocol (UDP) INIT datagram.

12. The system of claim 11, wherein the INIT datagram includes a public IP address and a public port number mapped by the firewall to a private IP address and a private port number of the receiver endpoint for receiving test traffic.

13. The system of claim 12, wherein the test traffic is addressed to the public IP address and the public port number, wherein the firewall receives the test traffic, maps the public IP address and public port number to the private IP address and the private port number, and sends the traffic to the receiver endpoint.

14. The system of claim 9, wherein the test traffic simulates multiple users and traffic for the multiple users.

15. The system of claim 9, wherein the test traffic is for testing an Internet connection, a security device, and/or connections within the private network.

16. The system of claim 9, wherein a performance test is executed without manually opening a port in the firewall associated with the private network.

17. A non-transitory computer readable medium comprising computer executable instructions embodied in the non-transitory computer readable medium that when executed by a processor of a computer perform steps comprising:

providing, by a test controller, test configuration information for configuring a performance test to a receiver endpoint in a private network and to a sender endpoint in a public network, wherein the test configuration information received at each endpoint is devoid of destination port addresses for receiving traffic from the other endpoint;

at the receiver endpoint in a private network, initiating a transport layer connection with the sender endpoint in a public network;

at the sender endpoint in the public network, allocating a first port for testing purposes, binding to the first port, and sending an Internet Protocol (IP) address and a port number associated with the first port over the transport layer connection to the receiver endpoint;

at the receiver endpoint, allocating a second port for testing purposes, binding to the second port, and sending an IP address and a port number associated with the second port in a hole punch datagram from the private network to the public network to create a hole in a firewall that is separating the public and private networks, wherein the hole punch datagram comprises a User Datagram Protocol (UDP) datagram in which a source IP address field stores the IP address and a source port field stores the port number associated with the second port; and at the sender endpoint, receiving the hole punch datagram and using the IP address and port information in the hole punch datagram to send test traffic to the receiver endpoint in the private network through the hole in the firewall.

* * * * *